(12) United States Patent
Lewis et al.

(10) Patent No.: US 11,856,264 B2
(45) Date of Patent: Dec. 26, 2023

(54) SYSTEMS AND METHODS FOR REDUCING DOWNLOAD REQUIREMENTS

(71) Applicant: Google LLC, Mountain View, CA (US)

(72) Inventors: Justin Lewis, Mountain View, CA (US); Richard Rapp, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/322,482

(22) PCT Filed: Nov. 15, 2016

(86) PCT No.: PCT/US2016/062113
§ 371 (c)(1),
(2) Date: Jan. 31, 2019

(87) PCT Pub. No.: WO2018/093354
PCT Pub. Date: May 24, 2018

(65) Prior Publication Data
US 2019/0208277 A1 Jul. 4, 2019

(51) Int. Cl.
*H04N 21/472* (2011.01)
*H04N 21/4722* (2011.01)
(Continued)

(52) U.S. Cl.
CPC ........ *H04N 21/4722* (2013.01); *G06F 9/485* (2013.01); *G06F 9/54* (2013.01);
(Continued)

(58) Field of Classification Search
None
See application file for complete search history.

(56) References Cited

U.S. PATENT DOCUMENTS 5,867,226 A * 2/1999 Wehmeyer ......... H04N 5/44543
725/46
5,991,306 A * 11/1999 Burns ................ H04B 7/18582
370/429

(Continued)

FOREIGN PATENT DOCUMENTS

CN 105052160 A 11/2015
EP 2 670 152 A2 12/2013
(Continued)

OTHER PUBLICATIONS

Examination Report for EP Appln. Ser. No. 16805941.8 dated May 18, 2021 (14 pages).
(Continued)

*Primary Examiner* — An Son P Huynh
(74) *Attorney, Agent, or Firm* — MARSHALL, GERSTEIN & BORUN LLP

(57) ABSTRACT

A method of reducing computer resource requirements for display of additional content on a client device configured for playback of media content can include determining, by an application installed on a client device, that display of additional content has been triggered from a first context of the application, identifying, by the application, a context identifier corresponding to the first context, determining, by a content manager installed on the client device, that an item of additional content associated with the context identifier is stored in a cache of the client device, identifying, by the content manager, an elapsed display time associated with the item of content, and initiating, by the application, display of the item of additional content based on the elapsed display time.

17 Claims, 4 Drawing Sheets

Content display process 300

US 11,856,264 B2

Page 2

(51) Int. Cl.
*H04N 21/433* (2011.01)
*G06F 9/54* (2006.01)
*G06F 9/48* (2006.01)
*H04N 21/442* (2011.01)
*H04N 21/658* (2011.01)
*H04N 21/2387* (2011.01)

(52) U.S. Cl.
CPC ..... *H04N 21/2387* (2013.01); *H04N 21/4331* (2013.01); *H04N 21/4333* (2013.01); *H04N 21/44204* (2013.01); *H04N 21/6581* (2013.01)

(56) References Cited

U.S. PATENT DOCUMENTS

| | | | | |
|---|---|---|---|---|
| 6,029,045 | A * | 2/2000 | Picco | H04N 7/165 |
| | | | | 348/E5.002 |
| 6,237,022 | B1 * | 5/2001 | Bruck | H04L 29/06 |
| | | | | 709/200 |
| 6,282,713 | B1 * | 8/2001 | Kitsukawa | H04H 60/63 |
| | | | | 725/36 |
| 6,298,482 | B1 * | 10/2001 | Seidman | H04N 5/44543 |
| | | | | 725/101 |
| 6,314,451 | B1 * | 11/2001 | Landsman | G06Q 30/0247 |
| | | | | 709/219 |
| 7,165,265 | B2 * | 1/2007 | Mori | H04N 21/8166 |
| | | | | 725/89 |
| 7,194,754 | B2 * | 3/2007 | Tomsen | H04N 21/4722 |
| | | | | 725/60 |
| 7,500,010 | B2 * | 3/2009 | Harrang | H04L 1/1671 |
| | | | | 709/233 |
| 7,523,016 | B1 * | 4/2009 | Surdulescu | G06F 21/316 |
| | | | | 702/185 |
| 8,001,561 | B2 * | 8/2011 | Gibbs | G06F 16/48 |
| | | | | 725/14 |
| 8,087,047 | B2 * | 12/2011 | Olague | H04N 7/17318 |
| | | | | 725/39 |
| 8,625,974 | B1 * | 1/2014 | Pinson | H04N 5/783 |
| | | | | 386/350 |
| 8,677,430 | B2 * | 3/2014 | Mitsuji | H04N 7/1675 |
| | | | | 725/93 |
| 8,689,266 | B2 * | 4/2014 | Bhogal | H04N 21/858 |
| | | | | 725/86 |
| 9,182,940 | B1 | 11/2015 | Chen et al. | |
| 9,363,464 | B2 * | 6/2016 | Alexander | H04N 21/4335 |
| 9,479,836 | B2 * | 10/2016 | Adimatyam | H04N 21/482 |
| 9,872,069 | B1 * | 1/2018 | Funk | H04N 21/8133 |
| 10,057,630 | B1 * | 8/2018 | Panchaksharaiah | G11B 27/11 |
| 10,250,917 | B1 * | 4/2019 | Nijim | H04N 21/274 |
| 10,448,217 | B2 * | 10/2019 | Shmueli | H04W 4/06 |
| 10,462,410 | B2 * | 10/2019 | Tang | H04N 5/85 |
| 2002/0056087 | A1 * | 5/2002 | Berezowski | H04N 7/165 |
| | | | | 725/9 |
| 2002/0188746 | A1 * | 12/2002 | Drosset | H04H 60/31 |
| | | | | 709/231 |
| 2003/0079224 | A1 * | 4/2003 | Komar | H04N 21/4122 |
| | | | | 725/32 |
| 2003/0149988 | A1 * | 8/2003 | Ellis | H04N 21/6175 |
| | | | | 725/87 |
| 2003/0208767 | A1 * | 11/2003 | Williamson | H04N 21/2221 |
| | | | | 725/93 |
| 2004/0015999 | A1 * | 1/2004 | Carlucci | H04N 21/434 |
| | | | | 725/136 |
| 2004/0133909 | A1 * | 7/2004 | Ma | H04N 21/4334 |
| | | | | 725/34 |
| 2005/0060745 | A1 * | 3/2005 | Riedl | H04N 21/2407 |
| | | | | 725/42 |
| 2006/0242667 | A1 * | 10/2006 | Petersen | H04N 21/44213 |
| | | | | 725/100 |
| 2006/0287912 | A1 * | 12/2006 | Raghuvamshi | G06Q 30/02 |
| | | | | 705/14.4 |
| 2007/0091101 | A1 * | 4/2007 | Huang | G06F 9/3879 |
| | | | | 345/506 |
| 2007/0157281 | A1 * | 7/2007 | Ellis | H04N 21/4147 |
| | | | | 725/74 |
| 2008/0177858 | A1 * | 7/2008 | Aarnio | G06F 16/9562 |
| | | | | 709/217 |
| 2009/0083225 | A1 * | 3/2009 | Jacobs | G06Q 30/02 |
| 2009/0094114 | A1 * | 4/2009 | Rice | G06Q 40/04 |
| | | | | 705/37 |
| 2009/0217336 | A1 * | 8/2009 | Chang | H04N 7/17318 |
| | | | | 725/115 |
| 2009/0300670 | A1 * | 12/2009 | Barish | H04N 7/17318 |
| | | | | 725/13 |
| 2010/0122282 | A1 * | 5/2010 | DuBose | H04N 21/6543 |
| | | | | 725/32 |
| 2010/0192188 | A1 * | 7/2010 | Rao | H04N 21/858 |
| | | | | 725/91 |
| 2010/0198943 | A1 * | 8/2010 | Harrang | H04L 67/06 |
| | | | | 709/217 |
| 2010/0275226 | A1 * | 10/2010 | Kitazato | H04N 21/6334 |
| | | | | 725/32 |
| 2011/0069940 | A1 * | 3/2011 | Shimy | H04N 21/44218 |
| | | | | 386/296 |
| 2011/0078023 | A1 * | 3/2011 | Aldrey | G06Q 30/0257 |
| | | | | 705/14.55 |
| 2011/0078572 | A1 * | 3/2011 | Milazzo | G06F 11/34 |
| | | | | 715/733 |
| 2011/0093610 | A1 * | 4/2011 | Rezaiifar | H04L 1/08 |
| | | | | 709/232 |
| 2011/0107365 | A1 * | 5/2011 | Chen | H04N 21/2541 |
| | | | | 725/29 |
| 2011/0145856 | A1 * | 6/2011 | Agarwal | H04N 21/6581 |
| | | | | 725/32 |
| 2011/0247044 | A1 * | 10/2011 | Jacoby | H04H 60/43 |
| | | | | 725/115 |
| 2012/0062473 | A1 | 3/2012 | Xiao et al. | |
| 2012/0099022 | A1 * | 4/2012 | Sundy | H04N 21/4331 |
| | | | | 348/705 |
| 2012/0131620 | A1 * | 5/2012 | Nozoe | H04N 9/8211 |
| | | | | 725/82 |
| 2012/0278179 | A1 * | 11/2012 | Campbell | G06Q 30/0255 |
| | | | | 705/14.69 |
| 2013/0036442 | A1 * | 2/2013 | Wingert | H04N 21/42209 |
| | | | | 725/60 |
| 2013/0124679 | A1 * | 5/2013 | Harrang | H04L 1/0007 |
| | | | | 709/217 |
| 2013/0145016 | A1 * | 6/2013 | Vantalon | H04N 21/6582 |
| | | | | 709/224 |
| 2013/0167168 | A1 * | 6/2013 | Ellis | H04N 21/25891 |
| | | | | 725/12 |
| 2013/0279308 | A1 * | 10/2013 | Helm | H04H 60/27 |
| | | | | 369/7 |
| 2013/0311575 | A1 * | 11/2013 | Woods | H04N 21/8456 |
| | | | | 709/206 |
| 2013/0347047 | A1 * | 12/2013 | Tanaka | H04N 21/8456 |
| | | | | 725/110 |
| 2014/0006951 | A1 * | 1/2014 | Hunter | H04N 21/4821 |
| | | | | 715/719 |
| 2014/0016911 | A1 * | 1/2014 | Hailey | H04N 21/414 |
| | | | | 386/234 |
| 2014/0033202 | A1 | 1/2014 | Weskamp et al. | |
| 2014/0259045 | A1 * | 9/2014 | Sangal | H04N 21/25891 |
| | | | | 725/23 |
| 2015/0040176 | A1 * | 2/2015 | Hybertson | H04N 21/812 |
| | | | | 725/131 |
| 2015/0100920 | A1 * | 4/2015 | Sanghavi | G06Q 50/01 |
| | | | | 715/804 |
| 2015/0106856 | A1 * | 4/2015 | Rankine | H04N 21/4725 |
| | | | | 725/60 |
| 2015/0150042 | A1 * | 5/2015 | Hwang | H04N 21/41407 |
| | | | | 725/32 |
| 2015/0243329 | A1 * | 8/2015 | Hadorn | H04N 21/8455 |
| | | | | 386/230 |
| 2015/0256903 | A1 * | 9/2015 | Walker | H04L 65/613 |
| | | | | 725/32 |
| 2015/0264418 | A1 * | 9/2015 | Jacobs | G06Q 30/02 |
| | | | | 725/8 |

(56) References Cited

U.S. PATENT DOCUMENTS

| | | | |
|---|---|---|---|
| 2015/0296250 A1* | 10/2015 | Casper | G06Q 30/0623 725/34 |
| 2015/0332352 A1* | 11/2015 | Kim | G06F 16/9577 705/14.73 |
| 2016/0063539 A1* | 3/2016 | Alla | G06Q 30/0201 705/14.45 |
| 2016/0094875 A1* | 3/2016 | Peterson | H04N 21/4312 725/41 |
| 2016/0137632 A1 | 5/2016 | Yu et al. | |
| 2016/0203338 A1* | 7/2016 | Dabbiru | G06F 16/2365 707/687 |
| 2016/0366203 A1* | 12/2016 | Blong | H04L 51/32 |
| 2017/0094370 A1* | 3/2017 | Jankowski | H04N 21/2668 |
| 2017/0111705 A1* | 4/2017 | Ma | H04N 21/4622 |
| 2017/0195746 A1* | 7/2017 | Gupta | H04N 21/6547 |
| 2017/0374315 A1* | 12/2017 | Ma | H04L 51/04 |
| 2018/0315096 A1* | 11/2018 | Lewis | G06Q 30/0272 |
| 2019/0132639 A1* | 5/2019 | Panchaksharaiah | H04N 21/2387 |
| 2019/0166412 A1* | 5/2019 | Panchaksharaiah | H04N 21/4825 |

FOREIGN PATENT DOCUMENTS

| | | | | |
|---|---|---|---|---|
| EP | 2670152 A2 | 12/2013 | | |
| EP | 2750032 A2 * | 7/2014 | | G06F 8/30 |
| WO | WO-9853611 A1 * | 11/1998 | | H04N 21/8586 |
| WO | WO-2013/089670 A1 | 6/2013 | | |
| WO | WO-2016/137632 A1 | 9/2016 | | |

OTHER PUBLICATIONS

Office Action for Chinese Application No. 201680088865.5, dated Nov. 30, 2022.
International Preliminary Report on Patentability for PCT Appl. Ser. No. PCT/US2017/061646 dated May 21, 2019 (15 pages).
International Preliminary Report on Patentability for PCT Appln. Ser. No. PCT/US2016/062113 dated Jul. 11, 2017 (11 pages).
International Search Report and Written Opinion for PCT Appl. No. PCT/US2016/062113 dated Jul. 11, 2017 (18 pages).
International Search Report and Written Opinion for PCT Appl. Ser. No. PCT/US2017/061646 dated Feb. 26, 2018 (22 pages).

\* cited by examiner

SYSTEMS AND METHODS FOR REDUCING DOWNLOAD REQUIREMENTS

RELATED APPLICATIONS

This application claims the benefit of and priority to P.C.T. Application No. PCT/US2016/062113, filed Nov. 15, 2016, entitled "Systems and Methods for Reducing Download Requirements," which is incorporated herein by reference in its entirety.

BACKGROUND

An application can cause a graphical user interface ("GUI") to be displayed on a display of a client device. The application can cause primary content to be displayed in this manner. During display of primary content, user interactions with the graphical user interface of the application may trigger the application to initiate display of additional content, or content presented during a pause or break in primary content. Referred to generally as "additional content", the content may appear before or after primary content as well as during primary content (and thus be interstitial to other primary content, for example). The additional content may need to be retrieved from a remote location for display.

SUMMARY

A client device can allow a user to terminate display of additional content and resume displaying primary content. To reduce required bandwidth usage associated with downloading additional content over a network, in one aspect of the present disclosure, a client device can display additional content and can locally store the additional content for later resumed display. Accordingly, one implementation of the present disclosure provides a method of reducing computer resource requirements for display of additional content on a client device configured for playback of media content, comprising: determining, by an application installed on a client device, that display of additional content has been triggered from a first context of the application; identifying, by the application, a context identifier corresponding to the first context; determining, by a content manager installed on the client device, that an item of additional content associated with the context identifier is stored in a cache of the client device; identifying, by the content manager, an elapsed display time associated with the item of additional content; and initiating, by the application, display of the additional item of content based on the elapsed display time. The client device can also store a playback time at which the additional content can be resumed.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Figure 1:
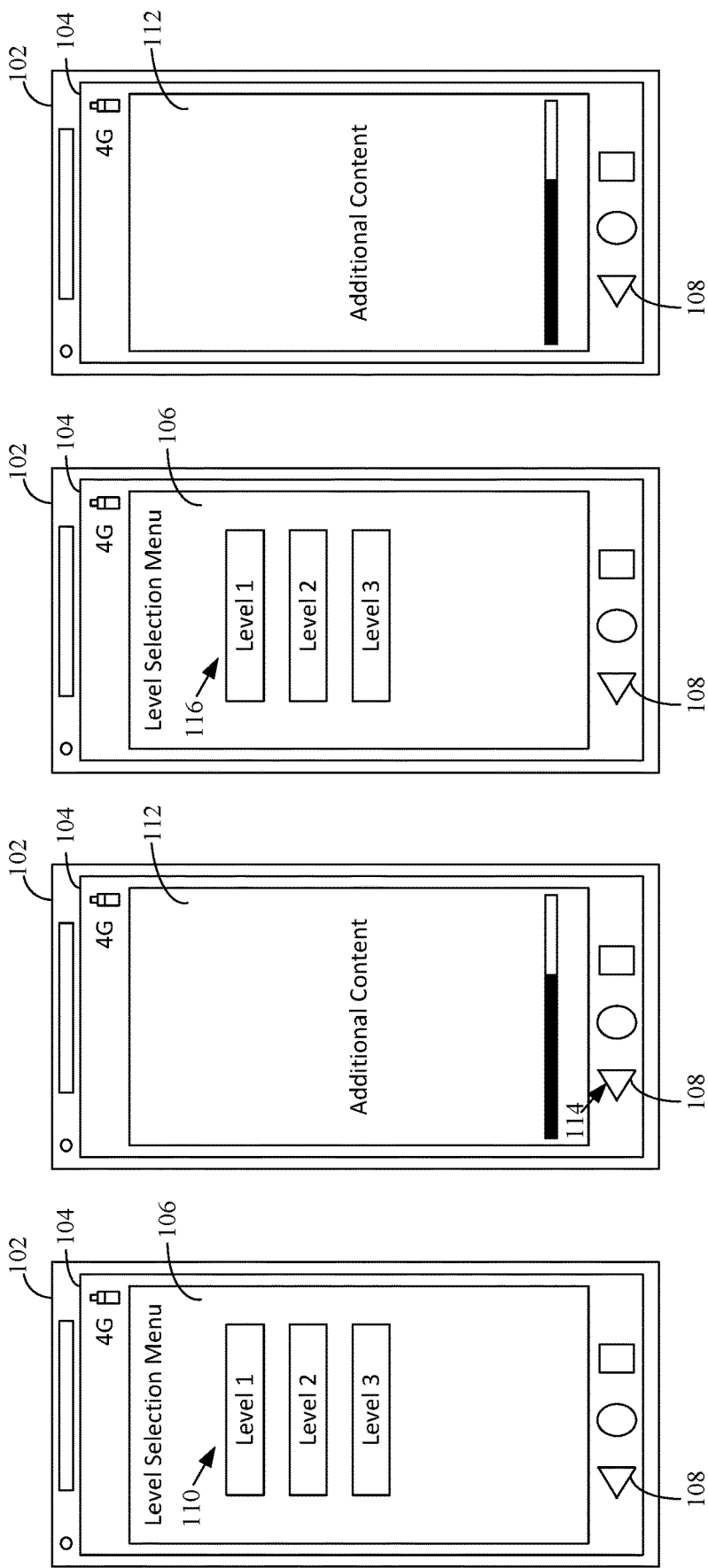
FIG. 1A depicts additional content being triggered in a first context, according to one implementation.
FIG. 1B depicts additional content being displayed on a client device, according to one implementation.
FIG. 1C depicts additional content being triggered in the same first context, according to one implementation.
FIG. 1D depicts the same additional content being displayed on the client device, according to one implementation.

It will be recognized that some or all of the figures are schematic representations for purposes of illustration. The figures are provided for the purpose of illustrating one or more embodiments with the explicit understanding that they will not be used to limit the scope or the meaning of the claims.

DETAILED DESCRIPTION

Following below are more detailed descriptions of various concepts related to, and implementations of, methods, apparatuses, and systems for reducing download requirements. The various concepts introduced above and discussed in greater detail below may be implemented in any of numerous ways as the described concepts are not limited to any particular manner of implementation. Examples of specific implementations and applications are provided primarily for illustrative purposes.

The present application is generally directed to systems and methods for reducing download requirements. Some applications executed on a client device cause a display of the device to display content. During display of content, user interactions with a GUI of the application, for example, may trigger the application to initiate display of additional content, such as pre-roll content, post-roll content, interstitial content or content during breaks, or other such additional content (all referred to generally herein and without limitation as "additional content"). Display of additional content may also be triggered in other ways, such as based on a schedule or based on particular processes of the application being executed a predetermined number of times. Display of additional content may unlock locked or additional content of an application.

Initiating display of additional content can involve the client device retrieving the additional content from a local data store or from a remote data store via, for example, a network. There can be problems associated with the client device retrieving the additional content via a network. A client device downloading a media file as additional content subsequent to initiating a display process can consume significant network resources. This may be disadvantageous, for example, for client devices that have limits on how much data can be downloaded while connected to the network, or for client devices in general in that significant computational resources may be used in such a process. Furthermore, if a number of client devices download media files over a network at a same time, the network's resources may be strained or may be unable to handle the demand.

This problem can be exacerbated when a user is forced to download multiple items of content, or a single item of content multiple times. For example, the application may cause the additional content to be displayed. The application may then receive an instruction to terminate display of the additional content after some initial portion of the additional content has been displayed. For example, in some applications, on some operating systems, a "back" button can be presented to a user during display of additional content. The application may interpret the back button being tapped or clicked or otherwise selected or activated as an instruction to terminate display of the additional content. If a user then retriggers display of additional content, the user may be forced to download and watch an entire new item of additional content, or forced to download and rewatch a portion of the additional content that has already been displayed. This can be frustrating for a user. This can be especially frustrating to a user who user may trigger display of additional content while attempting to access or unlock content of the application from a particular context. For example, a user may be presented with primary content of the application, trigger display of additional content to unlock other primary content, and, deciding not to watch the additional content, tap a back button during display of the additional content, thus terminating the display. The application may then again present the user with the primary content. The user may change their mind and decide to complete watching the additional content in order to unlock content, and may again trigger the additional content from the same context. The user may then be forced to download and rewatch the already-watched portion of additional content. The triggering of additional content from a same context can indicate, for example, that a user has retriggered additional content within a short time frame. Being forced to download rewatch additional content in a short time frame can be frustrating to users.

The systems and methods described herein help solve at least this problem by, for example, storing a portion of partially watched additional content on the client device, or an identifier to a portion of the partially watched content. In one aspect, the systems and methods described herein can involve initiating display of additional content from a first context, storing the additional content responsive to receiving an instruction to terminate display, and at a later time, again initiating display of the additional content from the first context, and continuing the display of the stored additional content. Continuing display of the stored additional content may involve retrieving the additional content from a local data store, rather than via a network, thus saving the client device from using computer resources to execute a download, and thus helping the client device and the network manage bandwidth and data download considerations. Furthermore, continuing display of the additional content can include setting a playback time of the additional content to a point where the display of the additional content was previously terminated. This provides a better user interface for a user interacting with or viewing the additional content and can help to ensure a better user experience to all users of such interface, no matter the background or context of such usage, in addition to reducing network and computing resources. This is because, it is unpleasant for a user to re-watch an initial portion of the additional content, and this is avoided using systems, devices and methods described in the present disclosure. Furthermore, in some implementations, continued display of the additional content may only be executed when the additional content is triggered from a same context as was the initial display of the additional content, and new additional content may be displayed when additional content is triggered from a different context. This can help to implement the computer-resource-saving process in situations most frustrating to users.

Display of additional content may be triggered in a context of the application. The term context, as used herein, can refer to one or more conditions present when the display of additional content is triggered. For example, a context can refer to particular content being displayed by the application, such as a particular web page being displayed by a web browser application, or a particular navigable screen being shown by a game application, such as a main menu screen, a level selection screen, or a level of the game through which an in-game object can navigate. A context can also refer to a particular manner in which the display of additional content is triggered. For example, the application can receive an indication that a link or button on a webpage has been clicked, tapped, or otherwise selected or activated. The receipt of that indication may trigger display of additional content. As another example, an in-game accomplishment, such as the completion of a level of the game, can trigger additional content. As a further example, an attempt to unlock locked or additional content available through the application can trigger additional content. Any of these manners of triggering additional content can constitute a context from which additional content is triggered. Furthermore, a context can be a combination of such conditions, such as a selection of a particular button on a particular navigable screen caused to be displayed by the application. A context can also include a timing condition, such as the application having been opened for a predetermined amount of time, or a level of a game application having been displayed for a predetermined amount of time. One or more contexts can be predefined for an application. Parameters or other information that can define a context may be stored on the client device and may be accessible to the application.

In some implementations, a context can include a background context and an additional content trigger context. For example, a displayed content context can be defined by particular primary content or a particular navigable screen being displayed when additional content display is triggered. An additional content trigger context can be defined by, for example, a manner in which additional content is triggered, such as a particular button or hyperlink of the primary content being selected. Defining a context in this manner can be useful, for example, for tracking a number of times that particular primary content has been displayed or navigated to separately from tracking a manner in which additional content is triggered. An example of this is described in more detail below in reference to FIG. 2.

FIGS. 1A through 1D depict retrieving and displaying content on a client device according to some implementations of the systems and methods described herein. FIG. 1A depicts some implementations of additional content being triggered in a first context. A client device 102 can display a GUI 104. The GUI 104 can show primary content 106. The primary content 106 can be, for example, a level selection menu of a game application installed on the client device 102. Although shown as an interactive application, in other implementations, the primary content 106 may be non-interactive content, such as a movie or television program, podcast, album, video web log ("vlog"), live multimedia stream, or any other such content. The GUI 104 can also show buttons, including a back button 108. In some implementations, a user interaction 110 can select the Level 1 button displayed in the GUI 104. The user may select the Level 1 button to unlock primary content related to level 1 of the game. The user interaction 110 can trigger the client device 102 to initiate a first display of the additional content 112.

FIG. 1B depicts a first display of the additional content 112 according to some implementations. The additional content 112 can be, for example, interstitial video content, such as a video guide to beating Level 1, or a tutorial for the game application, or a promotional offer. At some point during the first display of the additional content 112, a user interaction 114 can select the back button 108. According to some implementations, the client device can then responsively terminate display of the additional content 112, store the additional content 112 and store an elapsed display time of the additional content, and associate that information with a context, such as an activation of the Level 1 button from the level selection menu.

FIG. 1C depicts a display of the primary content 106 according to some implementations. In the depicted scenarios, the user did not complete display of the additional content 112 (e.g. did not display the content for a predetermined time period, did not allow a video to play for a predetermined duration, etc.), and thus did not unlock the level 1 content. Accordingly, the GUI 104 may not display the level 1 content. The GUI 104 can display the same primary content 106 that was displayed prior to the user triggering the first display of the additional content 112. The user can perform a user interaction 116 to select the Level 1 button again. This can trigger a second display of the additional content 112. Here, the client device 102 can determine that the second display of the additional content 112 was triggered from the same context as the first display of the additional content 112.

FIG. 1D depicts a continued display of the additional content 112. The client device 102 can, responsive to determining that the second display of the additional content 112 was triggered from the same context as the first display of the additional content 112, retrieve the stored additional content 112 and resume display. The client device 102 can resume display at a playback time based on the stored elapsed display time. In this way, the client device need not download another item of additional content, reducing bandwidth consumption, and the user need not rewatch an already-viewed portion of the additional content 112.

Figure 2:
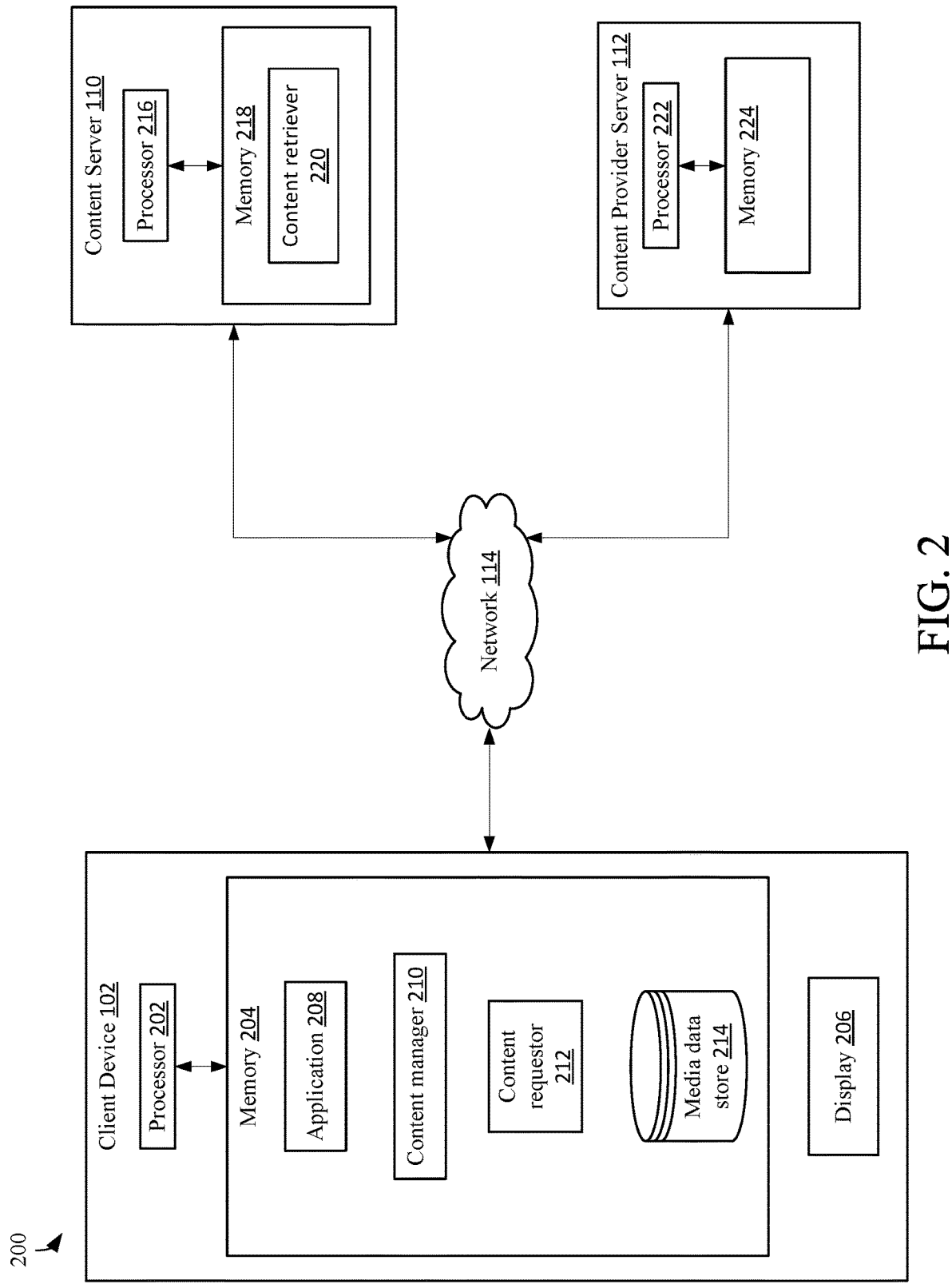
FIG. 2 is a block diagram depicting some implementations of a system for reducing download requirements.

FIG. 2 is a block diagram depicting an implementation of a system 200 for reducing download requirements using continued display of content. The system 200 may comprise one or more client devices 102 (which may be referred to herein as "the client device 102"), a content server 110, and a content provider server 112, each of which can communicate with one another via one or more networks, such as the network 114. In some implementations, the network 114 may include a Local Area Network (LAN), a Wi-Fi network, a cellular network, a wide area network (WAN), a telephone network, such as the Public Switched Telephone Network (PSTN), a wireless link, an intranet, the Internet, or combinations thereof.

Referring to the client device 102 in more detail, in some implementations, the client device 102 can include a display 206. The display 206 may comprise a liquid crystal (LCD) display, plasma display, light-emitting diode (LED) display, electrostatic (eInk) display, thermochroic display, cathode ray tube (CRT) display, or any other type and form of display device. Display 206 may be internal to client device 102, or external (e.g. a separate monitor, a wearable display such as a virtual reality or augmented reality display, etc.). In some implementations, the display 206 can be a touch display, such as a touch screen configured to receive tactile input and to convert the input to a signal. The display 216 can display, for example, a media file displayed by application 208.

The client device 102 can include one or more data processors 202 configured to execute instructions stored in a memory 204 to perform one or more operations described herein. The memory 204 may be one or more memory devices. In some implementations, the processor 202 and the memory 204 of the client device 102 may form a processing module. The processor 202 may include a microprocessor, an application-specific integrated circuit (ASIC), a field-programmable gate array (FPGA), etc., or combinations thereof. The memory 204 may include, but is not limited to, electronic, optical, magnetic, or any other storage or transmission device capable of providing processor with program instructions. The memory 204 may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from which processor can read instructions. The instructions may include code from any suitable computer programming language such as, but not limited to, C, C++, C#, Java®, JavaScript®, Perl®, HTML, XML, Python®, and Visual Basic®. The processor 202 may process instructions and output data to effect presentation of one or more media files on the client device 102.

In some implementations, the memory 204 may include one or more applications, services, routines, servers, daemons, or other executable logics for executing applications and for requesting and displaying media files. These applications, services, routines, servers, daemons, or other executable logics may be integrated such that they may communicate with one another or be enabled to make calls to routines of each other. In some implementations, these applications, services, routines, servers, daemons, or other executable logics may include an application 208, a content manager 210, a content requestor 212, and a media data store 214.

In some implementations, the application 208 can include one or more applications, including an application configured to initiate a content display process. For example, the application 208 can include a web browser application, a game application, a map application, video display application, a product or services or business review application, or any other application that can initiate a content display process.

In some implementations, the application 208 can initiate a display of additional content process by commanding the content manager 210 to retrieve content, such as content in the form of a media file from, for example, a local data store, such as media data store 214, or from a remote server such as the content server 110. The application 208 can initiate an additional content display process based on user input, such as user input via a keyboard (digital or analog), mouse, pointer, stylus, touch screen, other touch component, or any other input device. For example, the application 208 can cause buttons or links to be displayed on a GUI 104 displayed on the display 206, and can initiate an additional content display process responsive to the user clicking or otherwise selected one of the buttons or links. In some implementations, the application 208 can initiate an additional content display process based on, for example, a schedule for initiating additional content display. For example, the application 208 can initiate an additional content display process based on a predetermined amount of time having passed since the application was executed, or since a process of the application was executed, or based on a process of the application having been executed a predetermined number of times. The application 208 can initiate an additional content display process based on, for example, a primary content being displayed by the application for a predetermined amount of time. For example, the application 208 can be a video display application that, when executed, can display primary content, such as primary content selected by a user. The application 208 can display primary content, and can initiate an additional content display process after the primary content has been shown for a predetermined amount of time. The predetermined amount of time can be based on a total playtime of the primary content, or can be a fixed amount of time. In some implementations, the application 208 can initiate an additional content display process prior to a display of primary content, for example, immediately prior to the display of primary content, or can initiate an additional content display process following display of at least a portion of primary content.

As discussed above, the application 208 can initiate an additional content display process in a particular context. A context can be any individual condition or combination of conditions, such as a user interaction with an object of the GUI 104, a timing of the user interaction, or a primary content displayed by the GUI 104 when the display process is initiated. A plurality of contexts can be pre-defined for the application, and can be stored, for example, in a library of contexts, or can be defined as a particular executable process or set of processes being triggered, possibly in a particular order. A context can be associated with a context identifier, such as a string of characters that uniquely identifies the context for the application 208. In some implementations, a plurality of contexts can be in effect (e.g. are defined by conditions that are satisfied by a current state of the application 208, the GUI 104, and/or the client device 102) at a same time if, for example, some of the contexts are defined by at least one or more same conditions. In some implementations, if a plurality of contexts are in effect at a same time, a most specific context is considered to be the sole context in effect by the application 208 for purposes of some of the methods and systems described herein, such as for the purpose of determining in which context a display of additional content was initiated. For example, if a first context is defined by conditions A and B, and a second context is defined by conditions A, B and C, and all of conditions A, B and C are satisfied, then, in some implementations, the application can be configured to determine that the second context is uniquely in effect. In other implementations, the application can be configured to determine that both the first context and the second context are in effect.

In some implementations, the application 208 can increment an impression index that counts a number of times that the application 208 has satisfied a particular context. The impression index can be uniquely associated with the particular background context. For example, the application 208 can increment the impression index every time the application 208 navigates to or displays a particular background context, which can be defined by, for example, particular primary content being displayed on a screen. In some implementations, during display of primary content in a GUI 104 by the application 208, the GUI 104 can display a level selection screen having clickable level selection buttons, as depicted in FIG. 1A. This may satisfy the particular background context.

In some implementations, an additional content trigger context can be defined for the application 208. The additional content trigger context can include a same condition or set of conditions that defines the background context. For example, a particular additional content trigger context can be defined by the conditions of (i) the level selection screen being displayed and (ii) the Level 1 button being clicked. In some implementations, an additional content trigger identifier can be associated with the additional content trigger context. The additional content trigger identifier can be uniquely associated with the additional content trigger context. In some implementations, there the application 208 does not maintain an impression index that counts instances of the additional content trigger context being satisfied. This can be helpful, for example, in differentiating between additional content that is triggered by different mechanisms and in keeping a count of instances of in which the background context is satisfied. This can be used in some of the methods and systems described herein to (i) display a same item of additional content when a user triggers display of the additional content via a first mechanism, terminates display, and subsequently retriggers display via the same first mechanism, (ii) display different items of additional content when a user triggers display of additional content via a first mechanism, terminates display, and subsequently triggers display of additional content via a second mechanism, and (iii) display different items of additional content when a user triggers display of additional content in a background context, terminates display, navigates away from the background context, and subsequently navigates back to the background context (causing the impression index to be incremented) and then triggers display of additional content.

In some implementations, the application 208 can pass a context identifier and an associated impression index value to the content manager 210. In some implementations, the context identifier can be a background context identifier that uniquely identifies the background context, and the impression index value can be a count that counts instances of the background context being satisfied. The application 208 can further pass a unique additional content trigger identifier to the content manager 210. In some implementations, the application 208 can concatenate the background context identifier, the impression index value, and the additional content trigger identifier to generate a context token, and can pass the context token to the content manager 210. The context token can be used by the content manager, for example, to determine a context in which additional content was triggered.

In some implementations, the application 208 can display additional content on the display 216 as additional content. The application 208 can display the additional content responsive to receiving an instruction to do so by the content manager 210. The application 208 can receive an instruction to display additional content from the content manager 210, the instruction including a location at which the additional content can be retrieved. For example, the instruction can indicate that the additional content is stored in the media data store 214. In some implementations, the application 208 can display additional content that is stored in the media data store 214 and can set a playback time of the additional content to be equal to a stored playback time that is associated with the stored additional content. This can be used, for example, to allow a user to continue watching the additional content at a point where they left off. As another example, the instruction can indicate that the additional content has been retrieved by the content requestor 212 from the content server 110. In yet other implementations, the content requestor 212 can retrieve additional content from the content server 110 and can provide the additional content to the application 208, and the application 208 can then display the additional content on the display 216. In some implementations, the application 208 can display new primary content after display of the additional content. For example, the application 208 can display additional content responsive to the level 1 button of the level selection screen primary content 106 being selected, as depicted in FIG. 1A. Subsequent to display of the additional content, the application 208 can show new content, such as a first level screen. The first level screen can be referred to as new primary content, or unlocked primary content. In some implementations, the application 208 can display the new primary content only after additional content, such as a video additional content, has been displayed to completion, or has been displayed for more than a predetermined period of time. In other implementations, the new primary content can be displayed subsequent to the additional content having been displayed, regardless of the amount of time for which the primary content was displayed.

In some implementations, the application 208 can receive an instruction to terminate display of the additional content. For example, the application 208 can terminate display of additional content based on user input, such as user input via a keyboard (digital or analog), mouse, pointer, stylus, touch screen, other touch component, or any other input device. For example, the application 208 can cause buttons or links to be displayed on the GUI 104, and can terminate an additional content display process responsive to the user clicking or otherwise selected one of the buttons or links. In some implementations, the application 208 can terminate the display of additional content responsive to a back button of the GUI 104, such as the back button 108, being selected.

In some implementations, the application 208 can, subsequent to terminating the display of additional content, display a same background content that was displayed prior to display of the additional content. For example, the application 208 can display a level selection screen primary content 106, and the level 1 button of the level selection screen can be selected, as depicted in FIG. 1A. As depicted in FIG. 1B, the application 208 can then initiate display of additional content 112, and the back button 108 can be selected. The application 208 can subsequently display the same level selection screen 106 that was displayed prior to the display of the additional content 112. In other implementations, after receiving the request to terminate display, the application 208 can display new primary content.

In some implementations, the application 208 can store the additional content after it has been displayed. The application 208 can store the additional content and associate it any of the background context, the impression index, and the additional content trigger context. The application 208 can store the additional content and associate it with the token. The application 208 can store the additional content and associate it with an elapsed display time, such as information indicating an amount of time for which the additional content was displayed. In some implementations, the application 208 can determine, or can request that the content manager 210 determine, whether there is any already stored media data in the media data store 214 that corresponds to a context token associated with the displayed additional content. For example, if the displayed additional content was a displayed media file, and the application 208 determines that a same or similar media file is already stored in the media data store 214, the application 208 can delete the displayed media file rather than store it.

In some implementations, the application 208 can update an elapsed display time that is associated with the already stored media file. The application 208 can, for example, update the elapsed display time to be a sum of (i) the already stored elapsed display time, and (ii) a time for which the most recently displayed additional content was displayed. In other implementations, the application 208 can update the elapsed display time to be equal to the time for which the most recently displayed additional content was displayed. In some implementations, the application can separately store and associate with the token a total display time equal to a sum of all times for which the additional content was displayed, and a most recent playback time equal to a playtime at which display of a most recently displayed additional content was terminated. This can be used, for example, to store a running total of the time for which the additional content was displayed, and to separately store a time at which a user left off viewing the additional content. In some implementations, the application 208 can determine to show a same primary content after display of additional content is terminated based on a total display time being below a predetermined threshold. In some implementations, the application 208 can determine to show new or unlocked primary content based on the total display time being above or at the predetermined threshold.

In some implementations, the application 208 can determine a required display time for additional content that must be satisfied before the application 208 unlocks or permits access to a new item of primary content. The application 208 can determine the required display time for additional content to be, for example, a percentage of a total display time, such as 50%, 60%, 70%, 80%, 90%, 100%, or any other percent of the total display time of the additional content. The application 208 can determine the required display time for additional content to be, for example, a fixed display time, such as 5 second, 10 second, 15 seconds, 30 seconds, 60 seconds, or any other fixed display time. The application 208 can determine the required display time to be, for example, a time at which the additional content may be skipped, as indicated by the additional content or by data related to the additional content, such as data received from the content server along with the additional content.

The application 208 can store an indication that sufficient additional content has been displayed (e.g. sufficient additional content to satisfy a predetermined required display time) from a first context, and can associate that indication with a context identifier that identifies the first context. Subsequently, when a display of additional content is triggered from the first context, the application 208 can identify the indication that sufficient content has been displayed, and can responsively determine not to show additional content. In some implementations, the application 208 can delete or flush the indication that sufficient content has been displayed. For example, the application 208 can flush or delete the indication that sufficient content has been displayed based on at least one of: a predetermined amount of time having passed since the generation of the indication that sufficient content has been displayed, and display of additional content being triggered from the first context a predetermined number of times.

In some implementations, the application 208 can flush the impression index and/or the stored content. For example, when the application 208 is closed (e.g. execution of the application is terminated), the application 208 can reset the impression index value to an initial index value or can delete the impression index. When the application 208 is closed, the application can delete (or, for example, cause the content manger 210 to delete) the stored additional content associated with the impression index. In some implementations, when the application 208 navigates to new primary content from old primary content, the application 208 flushes an impression index related to the old primary content, and deletes stored additional content corresponding to the old primary content and the associated impression index. This can help to reduce data storage requirements for the client device 102 by maintaining only a single item of stored additional content and a single associated impression index.

In some implementations, the content manager 210 can include one or more applications, services, routines, servers, daemons, or other executable logics for managing display of additional content. The content manager can 210 can receive the context token from the application 208, and can determine whether there is any stored additional content in the media data store 214 that corresponds to the token. For example, if the token is a concatenation of a background context identifier, an impression index value (that can represent instances of the background context being satisfied), and an additional content trigger context identifier, the content manager can determine whether any stored content is associated with that token. This can be used in some of the methods and systems described herein to locate a same item of additional content when a user triggers display of the additional content via a first mechanism in a background context, terminates display, and subsequently retriggers display via the same first mechanism in the same background context, as all three of the background context, impression index value, and additional content trigger context identifier will be the same (assuming the user has not navigated away from, and then back to, the primary content that defines the background context).

In some implementations, responsive to determining that there is stored additional content that corresponds to the token, the content manager 210 can provide the additional content to the application 208 for display, such as by passing a location of the stored additional content to the application 208. The content manager 210 can additionally or alternatively provide information associated with the stored additional content or associated with token, such as a total elapsed display time and/or a time for which a most recently displayed additional content was displayed.

In some implementations, responsive to determining that there is no stored additional content that corresponds to the token, the content manager 210 can command the content requestor 212 to retrieve additional content from a content server 110. Subsequent to the content requestor 212 retrieving the additional content, the content manager 210 or the content requestor 212 can provide the retrieved additional content to the application 208 for display.

In some implementations, the content requestor 212 can include one or more applications, services, routines, servers, daemons, or other executable logics for requesting content. The content requestor 212 can include a network interface including one or more applications or other executable logics for receiving data via the network 114 and for transmitting data from the client device 102 to any of the other devices connected to the network 114.

In some implementations, the content requestor 212 can transmit a request for content in the form of a media file to the content server 110. The request can include content request information related the display of the content. For example, the content request information can include a range of acceptable playtimes of the content, a parameter indicating whether the content may include a skip option, a parameter indicating whether the content can be auto-play content, or other parameters. In some implementations, the content requestor 212 can receive a response to the request for content from the content server 110. The response can include, for example, a media file to serve as additional content. The content requestor 212 can provide the media file to the application 208, or to the content manager 210, or can store the media file in the media data store 214.

Referring now to the content server 110 in more detail, content server 110 can include one or more data processors 216 configured to execute instructions stored in a memory 218 to perform one or more operations described herein. The memory 218 may be one or more memory devices. In some implementations, the processor 216 and the memory 218 of the client content server 110 may form a processing module. The processor 216 may include a microprocessor, an application-specific integrated circuit (ASIC), a field-programmable gate array (FPGA), etc., or combinations thereof. The memory 218 may include, but is not limited to, electronic, optical, magnetic, or any other storage or transmission device capable of providing processor with program instructions. The memory 218 may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from which processor can read instructions. The instructions may include code from any suitable computer programming language such as, but not limited to, C, C++, C#, Java®, JavaScript®, Perl®, HTML, XML, Python®, and Visual Basic®.

The memory 218 can include one or more applications, services, routines, servers, daemons, or other executable logics for receiving a content request, for retrieving content, and for providing content in response to the request. The memory 218 can include a content retriever 220.

In some implementations, the content server 110 can receive a request for content from the content requestor 212 via, for example, a network, such as the network 114. The request can include content request information related the display of the content. For example, the content request information can include a range of acceptable playtimes of the content, a parameter indicating whether the content may include a skip option, or other parameters. The content server 110 can, responsive to receiving the request, command the content retriever 220 to retrieve data related to the request.

In some implementations, the content retriever 220 can include one or more applications, services, routines, servers, daemons, or other executable logics retrieving data related to a request for content. In some implementations, the content retriever 220 can retrieve the data related to a request for content by transmitting a request for one or more identifiers of items of content from one or more remote servers, such as the content provider server 112. The content retriever 220 can request identifiers of items of content that correspond to the content request information. For example, the content retriever 220 can request, from the content provider server 112, identifiers of media files that satisfy an acceptable playtime requirement included in the content request information. Such identifiers may later be used to identify media files already stored on the content server 110 that correspond to the identifiers. In some implementations, the content retriever 220 can request media files themselves, rather than or in addition to identifiers of items of content. This method can be used, for example, when the media files are not already stored on the content server 110, or are not readily accessible to the content server 110.

In some implementations, the content retriever 220 can receive a response to the request for identifiers of items of content or media files from the content provider server 112. The response can include, for example, identifiers of items of content that satisfy one or more requirements included in the content request information, and/or media files that satisfy one or more requirements included in the content request information. The content retriever 220 can retrieve the media files and can provide them to the content requestor 212 via, for example, t network 114.

Referring now to the content provider server 112 in more detail, the content provider server 112 can include one or more data processors 222 configured to execute instructions stored in a memory 224 to perform one or more operations described herein. The memory 224 may be one or more memory devices. In some implementations, the processor 222 and the memory 224 of the content provider server 112 may form a processing module. The processor 222 may include a microprocessor, an application-specific integrated circuit (ASIC), a field-programmable gate array (FPGA), etc., or combinations thereof. The memory 224 may include, but is not limited to, electronic, optical, magnetic, or any other storage or transmission device capable of providing processor with program instructions. The memory 224 may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from which processor can read instructions. The instructions may include code from any suitable computer programming language such as, but not limited to, C, C++, C#, Java®, JavaScript®, Perl®, HTML, XML, Python®, and Visual Basic®. The memory 224 can include one or more applications, services, routines, servers, daemons, or other executable logics for providing media files or identifiers of media files responsive to a request from the content server 110. In some implementations the content provider server 112 can receive from the content server 110 a request to identify content. The content provider server 112 can transmit a response to the request by transmitting to the content server 110 one or more identifiers of media files.

Figure 3:
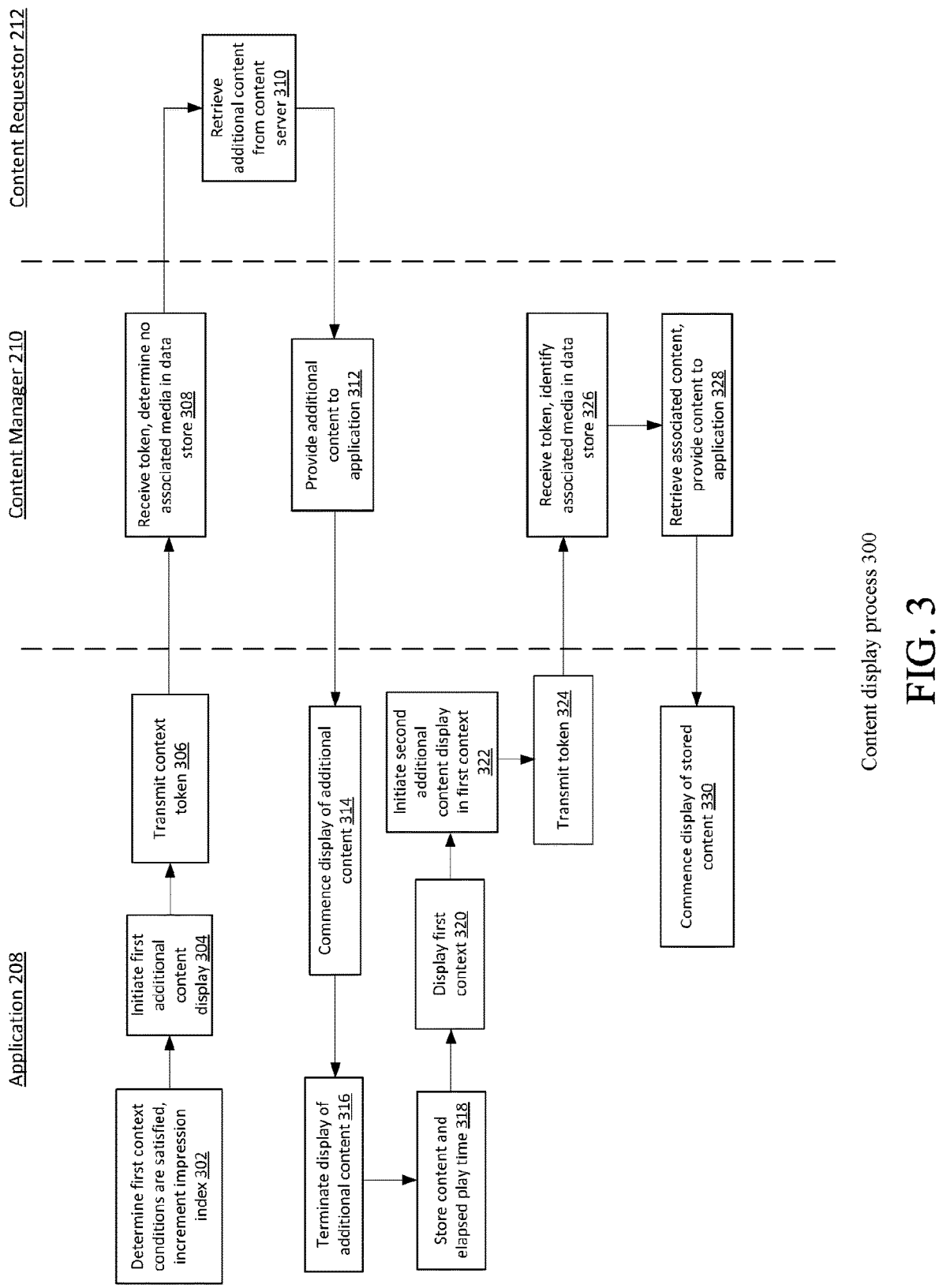
FIG. 3 is a flowchart depicting some implementations of a content display process.

Referring now to FIG. 3, illustrated is an implementation of a content display process 300. The content display process 300 can be a process for displaying additional content stored on the client device 102. Various steps of the content display process 300 and can be performed by, for example, the application 208, the content manager 210, and the content requestor 212. Although particular steps are described below as being performed by particular logic modules stored in the memory 204 of the client device 102, in other implementations the logic modules performing various steps can differ.

The content display process can include steps 302-330. Generally, at step 302, the application 208 can determine that conditions defining a first context are satisfied and increment an impression index value. At step 304, the application 208 can initiate a first additional content display process. At step 306, the application 208 can generate and transmit a corresponding context token to the content manager 210. At step 308, the content manager 210 can receive the token, and can determine that no associated media is stored in the media data store 214. At step 310, the content requestor 212 can retrieve additional content from the content server 110 via the network 114 and transmit the additional content to the application 208. At step 312, the content manager 210 can provide the retrieved additional content to the application 208. At step 314, the application 208 can commence display of the additional content. At step 316, the application can terminate display of the additional content. At step 318, the application 208 can store the additional content and store an elapsed play time. At step 320, the application 208 can display the first context. At step 322, the application 208 can initiate the second additional content display process in the first context. At step 324, the application 208 can transmit the token to the content manager 210. At step 326, the content manager 210 can receive the token, and can identify associated media stored in the media data store 214. At step 328, the content manager 210 can retrieve the associated content from the media data store 214, and can provide the content to the application 208. At step 330, the application 208 can commence display of the stored content as additional content.

Referring now to the steps of the content display process 300 in more detail, in some implementations, at step 302, the application 208 can conditions defining a first context are satisfied. For example, a user of the application may have navigated to the first context. In other words, the application 208 can display primary content, such as a webpage, video, or navigable screen, whose display satisfies the conditions of a first context. The conditions that define the first context can be predetermined for the application 208. In some implementations, the application 208 can perform a check of a plurality of conditions of plurality of contexts when a display process is performed, and can thus determine when a context has been "navigated to." In other implementations, the primary content may include metadata that indicates one or more contexts to which the primary content corresponds. The application 208 can determine, based on such metadata, which context(s) have been navigated to when initiating display of the primary content. In some implementations, the application 208 can further increment an impression index corresponding to the first context when the application 208 determines that the first context has been navigated to. The application 208 can then proceed to step 304.

In some implementations, at step 304, the application 208 can initiate display of additional content. The application 208 can initiate display of additional content based on, for example, being triggered by an additional content event, or based on an additional content display schedule. For example, the application 208 can receive an indication that a link or button on a webpage displayed on the GUI 104 has been clicked, tapped, or otherwise selected or activated. The receipt of that indication may trigger display of additional content. As another example, an in-game accomplishment, such as the completion of a level of the game, can trigger additional content. As a further example, an attempt to unlock locked or additional content available through the application can trigger display of additional content. The application 208 can initiate display of additional content based on a timing condition, such as the application 208 having been opened for a predetermined amount of time, or a level of a game application having been displayed for a predetermined amount of time. The application 208 can then proceed to step 306.

In some implementations, a step 306, the application 208 can generate a context token. The context token can be, for example, a concatenation of (i) an identifier of a background context in which display of additional content was triggered (e.g. an identifier of primary content displayed on the GUI 104 when additional content was triggered, such as a video file identifier or a webpage identifier), (ii) a value of an impression index corresponding to the background context (that represents, e.g., a number of times that the application 208 has navigated to primary content that defines, at least in part, the background context), and (iii) an additional content trigger identifier that identifies a manner in which the additional content was triggered (e.g. an identifier of a button that was selected, the selection triggering display of additional content). The token can be used in some of the methods and systems described herein to (a) display a same item of additional content when a user triggers display of the additional content via a first mechanism, terminates display, and subsequently retriggers display via the same first mechanism, (b) display different items of additional content when a user triggers display of additional content via a first mechanism, terminates display, and subsequently triggers display of additional content via a second mechanism, and (c) display different items of additional content when a user triggers display of additional content in a background context, terminates display, navigates away from the background context, and subsequently navigates back to the background context (causing the impression index to be incremented) and then triggers display of additional content. In other implementations, the token can be generated, for example, by concatenating a single context identifier (e.g. a background identifier) and an impression index value associated with the context identifier. By using such a token, some systems and methods described herein may not differentiate between different manners of triggering additional content (e.g. will treat triggering additional content by selecting a first button of primary content defining the context in a similar manner to triggering additional content by selecting a second button of the primary content). The application 208 can then proceed to step 308.

In some implementations, at step 308, the content manager 210 can receive the context token. The content manager 210 can determine that there is no additional content media file associated with the context token stored in the data media store 214. In some implementations, the content manager 210 can check the media data store 214 for an associated item of additional content by searching, for example, for a media file associated with the token. In some implementations, the content manager 210 can check the media data store 214 for an associated item of additional content by searching, for example, for a media file associated with both a context identifier and an associated impression index. In some implementations, responsive to determining that there is no media file stored in the media data store 214, the content manager 210 can transmit a request to the content requestor 212 to retrieve additional content. The content manager 210 can then proceed to step 310.

In some implementations, at step 310, the content requestor 212 can receive from the content manager a request to retrieve additional content from a remote server, such as, for example, the content server 110. The content requestor 212 can request and receive via, for example, the network 114, a media file to serve as the additional content. The content requestor 212 can provide the retrieved additional content to the application 208 directly, or, in some implementations, can provide the retrieved additional content to the content manager 210. The content requestor 212 can then proceed to step 312.

In some implementations, at step 312 the content manager 210 can provide the retrieved additional content to the application 208. The content manager 210 can provide the retrieved additional content to the application by, for example, storing the additional content locally and transmitting an indicator of the location of the additional content to the application 208. In some implementations, the content manager 210 can provide the additional content to the application 208 via streaming. For example, the content manager 210 can continuously download a media file as additional content, and prior to completing download of the media file, the content manager 210 can provide data corresponding to a first portion of the media file to the application 208. In this manner, the application 208 can begin display of the additional content before the additional content is fully downloaded. The content manager 210 can then proceed to step 314.

In some implementations, at step 314 the application 208 can commence display of the additional content. For example, the application can play the additional content media file and can display additional content on the display 206 of the client device 102. Display of the additional content can include display of selectable objects, including, for example, a back button, or another button that, when selected, instructs the application 208 to terminate display of the additional content. The application 208 can then proceed to step 316.

In some implementations, at step 316, the application 208 can terminate display of the additional content. The application 208 can terminate display of the additional content based on, for example, user input, such as a user selection of a back button or other button that when selected, instructs the application 208 to terminate display of the additional content. The application 208 can receive an instruction to terminate display of the additional content prior to completion of the display of the additional content (e.g. prior to a complete playing of a video media file). In some implementations where the content manager 210 streams the additional content to the application 208, upon the application 208 terminating display of the additional content, the content manager 210 can continue to download the additional content for some time (such as a predetermined period of time, or a period of time sufficient to download a predetermined amount of data), and can then terminate streaming and terminate downloading. This can allow the client device 102 to store content such that when display of the additional content is resumed by the application 208, little or no buffering time is required prior to commencement of display of the additional content. The application 208 can then proceed to step 318.

In some implementations, at step 318, the application 208 can store the additional content and an elapsed play time of the additional content in the media data store 214, and can associate that data with the context token. The application 208 can update an elapsed display time that is associated with the already stored media file. The application 208 can, for example, update the elapsed display time to be a sum of (i) the already stored elapsed display time, and (ii) a time for which the most recently displayed additional content was displayed. In other implementations, the application 208 can update the elapsed display time to be equal to the time for which the most recently displayed additional content was displayed. The application 208 can then proceed to step 320.

In some implementations, at step 320, the application 208 can display primary content that defines the first context. The application 208 can display the primary content of the first context, rather than new or unlocked content. In some implementations, the application 208 may only show new or unlocked content if the additional content was displayed to completion, or if, when additional content is triggered, the application 208 determines that the context token is associated with a stored elapsed display time above a predetermined threshold, or determines that the context token is associated with an indication that sufficient additional content (e.g. a duration or amount above said predetermined threshold) has been displayed to allow display of new or unlocked content. In the depicted example content display process 300, at step 316 the application 208 terminated display of additional content prior to completion, and the application 208 can determine to display the primary content of the first context based on that termination. The application 208 can then proceed to step 322.

In some implementations, at step 322, the application 208 can initiate a second display of additional content in the first context. The application 208 can then proceed to step 324. At step 324, the application 208 can generate a context token and can transmit the token to the content manager 210. The application 208 can then proceed to step 326. Steps 322 and 324 can be performed in a manner similar to that described above in reference to steps 304 and 306, or in any other appropriate manner.

In some implementations, at step 326 the content manager 210 can identify a stored media file in the stored media data store 214 that is associated with the context token. The content manager 210 can further identify any of a stored elapsed playtime, a total elapsed playtime, and a most recent elapsed playtime associated with the context token. The content manager 210 can then proceed to step 328. In some implementations, at step 328 the content manager 210 can retrieve the identified content and elapsed playtime information, and can provide those to the application 208. The content manager 210 can then proceed to step 330.

In some implementations, at step 330, the application 208 can commence display of the retrieved media file as additional content. The application 208 can commence display of the additional content at a playback time based on, for example, the stored most recent elapsed display time. In some implementations, the application 208 can commence display of the additional content at a playback time some predetermined amount of time prior to the most recent elapsed display time.

Figure 4:
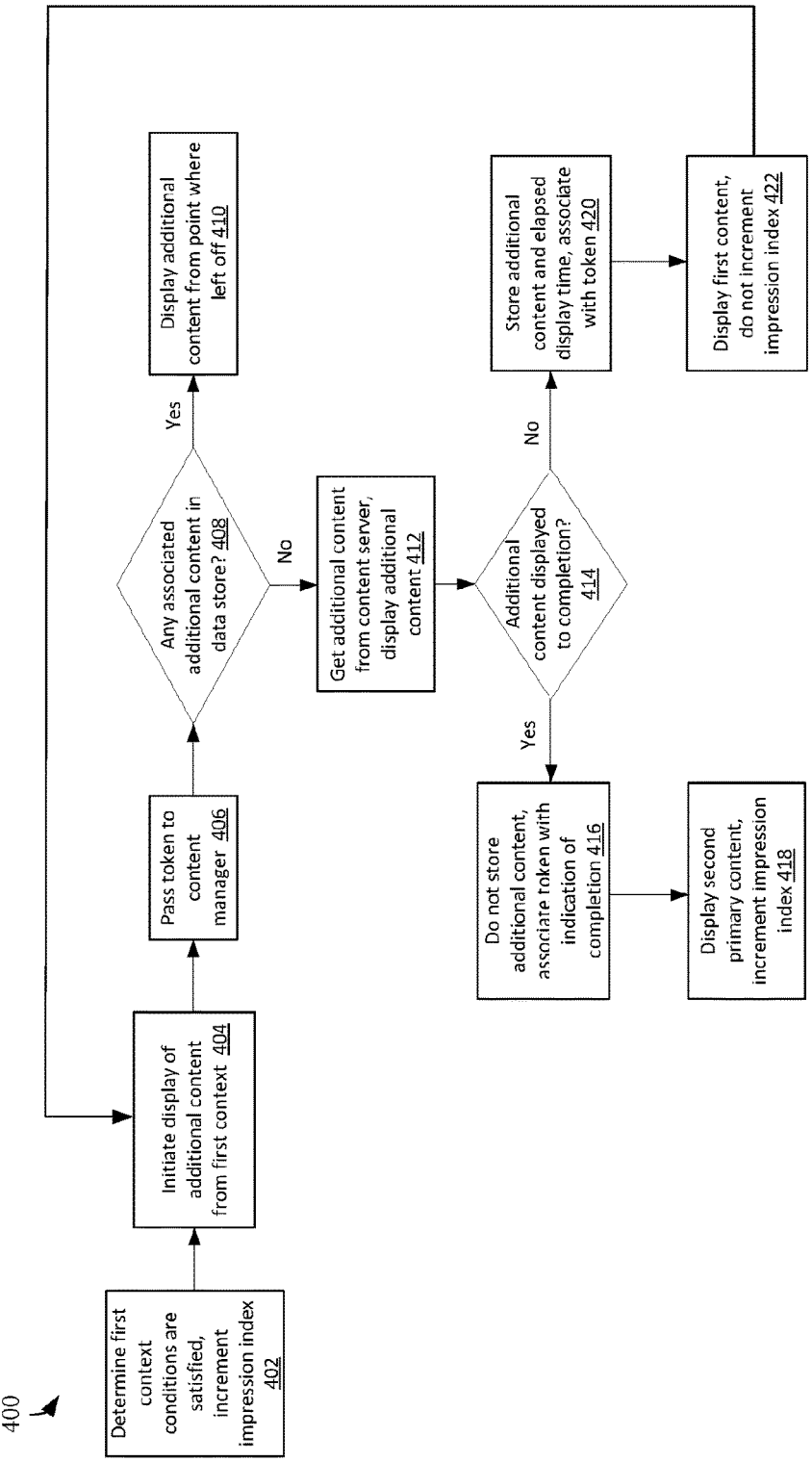
FIG. 4 is a flowchart depicting some implementations of a content display process.

Referring now to FIG. 4, illustrated is a flowchart depicting a content display process 400. The content display process 400 can include steps 402-424. Generally, at step 402, the application 208 can display first content that defines the first context, can determine that conditions defining a first context are satisfied, and can increment an associated impression index. At step 404, the application 208 can initiate display of additional content from the first context. At step 406, the application 208 can generate and pass the context token to the content manager 210. At step 408, the content manager 210 can determine if there is any locally stored additional content that is associated with the token. If the content manager 210 determines that there is locally stored additional content associated with the token, the content manger 210 can proceed to step 410 and can provide the stored content to the application 208, and the application 208 can display the additional content at a point where a prior display of the additional content was terminated. If the content manager 210 determines that there is no locally stored additional content associated with the token, the content manager 210 can proceed to step 412. At step 412, the content retriever 220 can retrieve additional content from the content server 110, and can provide the additional content to the content manager 210. The content manager 210 can provide the additional content to the application 208, which can display the additional content. The application can proceed to step 414. At step 414, the application can display the additional content to completion, and can proceed to step 416. At step 416, the application can associate the token with an indication of completed display of additional content. The application 208 can then proceed to step 418, can display new or unlocked second content, and can increment an impression index associated with the second content. Returning to step 414, rather than display the additional content to completion, the application 208 can or the application can terminate display of the additional content prior to completion of the display of additional content, in which case the application 208 can proceed to step 420. At step 420, the application 208 can store the additional content and an elapsed display time and associate those with the token. The application 208 can then proceed to step 422, and the application 208 can display the same first content displayed at step 404. At step 422, the application does not increment the impression index when the first content is displayed. The application 208 can then proceed to step 404 if display of additional content is triggered.

Referring now to the steps of the content display process 400 in more detail, in some implementations, steps 402 through 412 can be performed in a manner similar to steps 302 through 314 of the content display process 300, described in detail above in reference to FIG. 3. The application 208 can then proceed to step 414. At step 414, the application 208 can display the additional content to completion and proceed to step 416. At step 414, the application 208 can terminate the additional content prior to completion, and can proceed to step 420.

In some implementations, at step 416, the application 208 can associate the additional content with an indication of completion. For example, the application 208 can associate the token with a parameter indicating that additional content has been displayed for a sufficient period of time to unlock second content. In implementing future additional content display processes, the content manager 210, when searching for stored content associated with the token, can thus identify the indication of completion. In some implementations, responsive to identifying the indication of completion, the content manager 210 can then instruct the application 208 to skip the additional content display process. The application 208 can then display primary content, such as new or unlocked primary content.

In some implementations, at step 418, subsequent to storing an indication of completion the application 208 can display second primary content. The second primary content can be, for example, new or unlocked primary content. The new or unlocked primary content can be, for example, a new level of a game application, or a new webpage of a web-browsing application. In some implementations, an item of content can include a first portion and a second portion, constituting first content and second content, respectively. For example, a video might include a first portion and a second portion. The first portion can constitute first content, and the second portion can constitute second content. Similarly, a web page may include a first item of text and a second item of text. The first item of text might constitute first content, and the second item of text might constitute unlockable second content. In some implementations, at step 418, the application 208 can unlock or display the second content. The application 208 can increment an impression index that counts a number of instances in which the application navigates to the second content (e.g. a number of instances in which a second context defined by the second content is satisfied).

Returning to step 414, in some implementations the application 208 can receive an instruction to terminate display of additional content prior to complete display of the additional content. The application 208 can then proceed to step 420, and can store the additional content and can store or update an elapsed display time. This can be performed in any appropriate manner, such as the manner described above in reference to step 318 of the content display process 300. The application can then proceed to step 422.

In some implementations, at step 422, the application 208 can display a same first content that was displayed in step 402. Display of the first content subsequent to termination of display of additional content prior to completion can be used to prevent second content from being displayed or unlocked until the additional content has been displayed for a sufficient amount of time. At step 422, the application 208 may not increment the impression index associated with the first content. For example, the application 208 can display first content corresponding to a first context at step 402 by, for example, loading a webpage, and can increment an impression index associated with the first context. The application 208 can subsequently display additional content at step 412 in, for example, a window superimposed over the first content. A back button can selected at step 414, thus terminating display of the additional content. The window in which the additional content was displayed may be closed and the first content may again be displayed without the application 208 incrementing the impression index a second time. The additional content can be stored and associated with the first context and the associated impression index. Should additional content later be triggered from a first context defined by the first content, the application 208 can proceed to step 404 and can generate a context token including a same impression count as was associated with the stored additional content. The application 208 and the content manager 210 can then use the generated token to resume display of the additional content.

Accordingly, the systems, methods and devices discussed herein provide implementations for reducing download requirements for display of content, potentially improving bandwidth consumption and reducing inter-device communications, improving battery life of client devices by resuming locally stored content, and further provide a better user experience with an application GUI such that a user can be presented with content at a point where the user previously left off.

In one aspect, the present disclosure is directed to a method of reducing computer resource requirements for display of additional content on a client device configured for playback of media content. The method can include determining, by an application installed on a client device, that display of additional content has been triggered from a first context of the application, identifying, by the application, a context identifier corresponding to the first context, determining, by a content manager installed on the client device, that an item of additional content associated with the context identifier is stored in a cache of the client device, identifying, by the content manager, an elapsed display time associated with the item of additional content, and initiating, by the application, display of the item of additional content based on the elapsed display time.

In some implementations, the method can further include determining, by the application at a time prior to the determining that display of additional content has been triggered, that an initial display of additional content has been triggered from the first context, identifying, by the application, the context identifier corresponding to the first context, determining, by the content manager, that additional content associated with the context identifier is absent from the cache of the client device, transmitting, by a content requestor installed on the client device to a content server, a request for additional content, receiving, by the content requestor, the item of additional content for display from the content server, initiating, by the application responsive to receipt of the item of additional content, display of the item of additional content, receiving, by the application, an instruction to terminate display of the item of additional content prior to expiration of a predetermined display time, and storing, by the application in the cache, the item of additional content, the context identifier, and an elapsed display time for the item of additional content.

In some implementations, the method can further include the application determining, prior to receiving an instruction to terminate display of the item of additional content, the predetermined required display time to be one of: a time beginning at which the item of additional content can be skipped, a total playtime of the item of additional content, and a total playtime of the item of additional content less a predetermined amount of time.

In some implementations, the method can further include associating the context identifier with a count of an impression index that indicates a number of times that conditions defining the first context have been satisfied, determining, by the application, that one or more conditions which define a second context are satisfied, subsequently determining, by the application, that one or more conditions which define the first context are satisfied, incrementing, by the application, the impression index associated with the context identifier corresponding to the first context, determining, by the application, that display of additional content has been triggered from the first context of the application, determining, by the application, that additional content associated with the count of the impression index is absent from the cache of the client device, transmitting, by the content requestor to a content server, a request for additional content, receiving, by the content requestor from the content server, a second item of additional content for display by the client device, and initiating, by the application responsive to receipt of the item of additional content, display of the second item of additional content.

In some implementations, the method can further include resetting or deleting, by the application, the impression index responsive to one of: determining that one or more conditions which define the second context are satisfied or termination of the application.

In some implementations, the method can further include setting the playback time of the item of additional content to one of: the elapsed display time, and a second time a predetermined value less than the elapsed display time.

In some implementations, the method can further include downloading, by the content requestor, at least a portion of the item of additional content, storing the item of additional content further comprises storing the downloaded portion of the item of additional content, and reinitiating downloading, by the content requestor, of the item of additional content following the determination that the item of additional content associated with the context identifier is stored in the cache.

In some implementations, the method can further include continuing to download, by the content requestor, the additional content for a predetermined period of time or until a predetermined amount of additional data has been downloaded, following receipt of the instruction to terminate display of the item of additional content.

In some implementations, the method can further include determining, by the application, subsequent to initiating display of the item of additional content based on the elapsed display time, that a second display of additional content has been triggered from the first context of the application, identifying, by the application, the context identifier corresponding to the first context, determining, by the content manager, that the item of additional content associated with the context identifier is stored in the cache, identifying, by the content manager, the stored elapsed display time associated with the item of additional content, initiating, by the application, a second display of the item of additional content based on the stored elapsed display time, receiving, by the application, an instruction to terminate the second display of the item of additional content, storing, by the application in the cache, the item of additional content, the context identifier, updating, by the application, the stored elapsed display time for the item of additional content to be equal to a sum of (i) the stored elapsed display time and (ii) a time of display for the second display of the item of additional content.

In a second aspect, the present disclosure is directed to a method of reducing computer resource requirements for display of additional content on a client device configured for playback of media content. The method can include determining, by an application installed on a client device, that display of additional content has been triggered from a first context, identifying, by the application, a context identifier corresponding to the first context, determining, by a content manager installed on the client device, that additional content associated with the context identifier is absent from a cache of the client device, transmitting, by a content requestor installed on the client device to a content server, a request for additional content, receiving, by the content requestor from the content server, an item of additional content for display by the client device, initiating, by the application responsive to receipt of the item of additional content, display of the item of additional content, receiving, by the application, an instruction to terminate display of the item of additional content, determining, by the application, that additional content has been displayed for a predetermined required display time based on an elapsed display time for the item of additional content, associating with the context identifier, by the application responsive to determining that additional content has been displayed for the predetermined required display time, an indication that no additional content is to be displayed when additional content is triggered from the first context, subsequently determining, by the application, that display of additional content has been triggered from the first context, identifying, by the content manager, the indication that no additional content is to be displayed, and subsequently unlocking content or providing access to an item of primary content, by the application.

In some implementations, the method can further include identifying, by the application, an impression index associated with the context identifier corresponding to the first context, and determining, by the content manager, that additional content associated with a count of the impression index is absent from the cache.

In some implementations, the method can further include determining that additional content has been displayed for a predetermined required display time corresponding to at least one of: a time beginning at which the item of additional content can be skipped, a total playtime of the item of additional content, and a total playtime of the item of content less a predetermined amount of time.

In some implementations, the method can further include deleting, by the application, the indication that no additional content is to be displayed based on at least one of: determining that a predetermined amount of time has passed since generating the indication that no additional content is to be displayed, and determining that display of additional content has been triggered from the first context a predetermined number of times.

In a third aspect, the present disclosure is directed to a device configured for playback of media content with reduced download requirements. The device can include a processor executing an application and a content manager, and a memory comprising a cache. The application can be configured to determine that display of additional content has been triggered from a first context of the application, and identify a context identifier corresponding to the first context. The content manager can be configured to determine that an item of additional content associated with the context identifier is stored in the cache, and identify an elapsed display time associated with the item of additional content. The application can further be configured to initiate display of the item of additional content based on the elapsed display time.

In some implementations, the device processor can further execute a content requestor. The application can further be configured to determine, at a time prior to determining that display of additional content has been triggered, that an initial display of additional content has been triggered from the first context, and identify the context identifier corresponding to the first context. The content manager can further be configured to determine that additional content associated with the context identifier is absent from the cache. The content requestor can further be configured to transmit, to a content server, a request for additional content, and receive, from the content server, an item of additional content for display by the client device. The application can further be configured to initiate, responsive to receipt of the item of additional content, display of the item of additional content, receive an instruction to terminate display of the item of additional content prior to expiration of a predetermined display time, and store, in the cache, the item of additional content, the context identifier, and an elapsed display time for the item of additional content.

In some implementations, the application can be further configured to determine, prior to receiving an instruction to terminate display of the item of additional content, the predetermined required display time to be one of: a time beginning at which the item of additional content can be skipped, a total playtime of the item of additional content, and a total playtime of the item of additional content less a predetermined amount of time.

In some implementations, the application can be further configured to associate the context identifier with a count of an impression index that indicates a number of times that conditions defining the first context have been satisfied, determine that one or more conditions which define a second context are satisfied, subsequently determine that one or more conditions which define the first context are satisfied, increment the impression index associated with the context identifier corresponding to the first context, determine that display of additional content has been triggered from the first context of the application, and determine that additional content associated with the count of the impression index is absent from the cache of the client device. The content requestor can be further configured to transmit, to a content server, a second request for additional content, and receive, from the content server, a second item of additional content for display. The application can be further configured to initiate, responsive to receipt of the second item of content, display of the second item of additional content.

In some implementations, the application can be further configured to reset or delete the impression index responsive to one of: determining that one or more conditions which define the second context are satisfied or termination of the application.

In some implementations, the content requestor can be further configured to download at least a portion of the item of additional content, and reinitiate download of the item of additional content responsive to the content manager determining that the item of additional content associated with the context identifier is stored in the cache. The application can be further configured to store, in the cache, the downloaded portion of the item of additional content.

In some implementations, the application can be further configured to determine, subsequent to initiating display of the item of additional content based on the elapsed display time, that a second display of additional content has been triggered from the first context of the application, and identify the context identifier corresponding to the first context. The content manager can be further configured to determine that the item of additional content associated with the context identifier is stored in the cache, and identify the stored elapsed display time associated with the item of additional content. The application can be further configured to initiate a second display of the item of content based on the stored elapsed display time, receive an instruction to terminate the second display of the item of additional content, store, in the cache, the item of additional content and the context identifier, and update the stored elapsed display time for the item of additional content to be equal to a sum of (i) the stored elapsed display time and (ii) a time of display for the second display of the item of additional content.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products embodied on tangible media. References to "or" may be construed as inclusive so that any terms described using "or" may indicate any of a single, more than one, and all of the described terms.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The claims should not be read as limited to the described order or elements unless stated to that effect. It should be understood that various changes in form and detail may be made by one of ordinary skill in the art without departing from the spirit and scope of the appended claims. All implementations that come within the spirit and scope of the following claims and equivalents thereto are claimed.

What is claimed is:

1. A method comprising:
receiving, by a client device and from a content server, an item of additional content for display, in response to detecting a first event by an application executing on the client device while the application is presenting primary content, wherein the first event includes one or more of: (i) the application being open for a fixed amount of time, (ii) the primary content being presented by the application for a fixed amount of time, (iii) an attempt to unlock primary content in the application, or (iv) a game accomplishment in the application;
providing, by the client device, responsive to detecting the first event, the item of additional content for display;
receiving, by the client device, an interaction with a selectable object while the application is presenting the item of additional content to cause the application to navigate back to the same primary content;
generating, by the client device, in response to receipt of the interaction with the selectable object, a context token based on an impression index value, a context identifier while the application is presenting the primary content, and identifier of the first event, wherein the impression index value indicates a number of times that conditions defining context while the application is presenting primary content have been satisfied;
in response to receipt of the interaction with the selectable object, locally storing, by the client device, the context token, the item of additional content and a first time corresponding to an amount of the item of additional content that was presented up to the interaction with the selectable object;
detecting, by the client device, subsequent to the interaction with the selectable object that caused the application to navigate back to the same primary content, a second event while the application is presenting the same primary content, to cause the application to display the item of additional content, wherein the second event includes one or more of: (i) the application being open for a fixed amount of time, (ii) the primary content being presented by the application for a fixed amount of time, (iii) an attempt to unlock primary content in the application, or (iv) a game accomplishment in the application;
determining, by the client device, whether to initiate display of the item of additional content from the first time or whether to retrieve another item of additional content from the content server, based on whether the item of additional content is stored locally on the client device and the context token; and
initiating, by the client device, display of the item of additional content from the first time, based on determining that the item of additional content is stored locally by the client device and based on the context token.

2. The method of claim 1, further comprising:
identifying, by the client device, the context identifier;
determining, by the client device, that content associated with the context identifier is absent from the client device; and
transmitting, by the client device to the content server, a request for additional content.

3. The method of claim 2, further comprising:
associating, by the client device, the context identifier with the impression index value;
determining, by the client device, that one or more of the conditions which define the primary content are satisfied;
incrementing, by the client device, the impression index value associated with the context identifier;
determining, by the client device, that display of additional content has been triggered from the primary content of the application;
determining, by the client device, that additional content associated with the impression index value is absent from the client device;
transmitting, by the client device to the content server, a content request for another item of additional content;
receiving, by the client device from the content server, a second item of additional content for display by the client device; and
initiating, by the client device responsive to receipt of the second item of additional content, display of the second item of additional content.

4. The method of claim 3, wherein the one or more conditions are first conditions and further comprising:
resetting or deleting, by the client device, the impression index value responsive to determining that one or more second conditions which define a second context are satisfied.

5. The method of claim 2, further comprising:
determining, by the client device, subsequent to initiating display of the item of additional content for an elapsed display time, that a second display of the item of additional content has been triggered from the primary content of the application;
identifying, by the client device, the context identifier;
determining, by the client device, that the item of additional content associated with the context identifier is stored on the client device;
identifying, by the client device, the elapsed display time associated with the item of additional content;
initiating, by the client device, the second display of the item of additional content based on the elapsed display time;
receiving, by the client device, an instruction to terminate the second display of the item of additional content;
storing, by the client device, the item of additional content, and the context identifier; and
updating, by the client device, the elapsed display time for the item of additional content to be equal to a sum of (i) the stored elapsed display time and (ii) a time of display for the second display of the item of additional content.

6. The method of claim 1, further comprising the client device determining, prior to receiving the interaction to navigate back to the primary content, a predetermined required display time to be one of: a display time beginning at which the item of additional content can be skipped, a total playtime of the item of additional content, and a total playtime of the item of additional content less a predetermined amount of time.

7. A non-transitory computer-readable medium that stores instructions that, when executed by one or more processors of a client device, cause the one or more processors to perform operations comprising:
receiving, from a content server, an item of additional content for display in an application in response to detecting a first event in the application while the application is presenting primary content, wherein the first event includes one or more of: (i) the application being open for a fixed amount of time, (ii) the primary content being presented by the application for a fixed amount of time, (iii) an attempt to unlock primary content in the application, or (iv) a game accomplishment in the application;
providing, responsive to detecting the first event, the item of additional content for display;
receiving an instruction to navigate back to the same primary content via an interaction with a selectable object while the application is presenting the item of additional content;
generating, in response to receipt of the interaction with the selectable object, a context token based on an impression index value, a context identifier while the application is presenting the primary content, and identifier of the first event, wherein the impression index value indicates a number of times that conditions defining context while the application is presenting primary content have been satisfied;
in response to receipt of the interaction with the selectable object, locally storing, the item of additional content, the context token, and a first time corresponding to an amount of the item of additional content that was presented up to the interaction with the selectable object;
detecting, subsequent to the interaction with the selectable object that caused the application to navigate back to the same primary content, a second event while the application is presenting the same primary content, to cause the application to display the item of additional content, wherein the second event includes one or more of: (i) the application being open for a fixed amount of time, (ii) the primary content being presented by the application for a fixed amount of time, (iii) an attempt to unlock primary content in the application, or (iv) a game accomplishment in the application;
determining whether to initiate display of the item of additional content from the first time, or whether to retrieve another item of additional content from the content server, based on whether the item of additional content is stored locally on the client device and the context token;
initiating display of the item of additional content from the first time based on determining that the item of additional content is stored locally on the client device, and based on the context token.

8. The non-transitory computer-readable medium of claim 7, wherein the instructions, when executed by the one or more processors, further cause the one or more processors to perform operations comprising:
identifying an impression index value associated with the context identifier; and
determining that the item of additional content associated with the impression index value is absent from the client device.

9. The non-transitory computer-readable medium of claim 7, wherein the instructions, when executed by the one or more processors, further cause the one or more processors to perform operations comprising:
determining that the item of additional content has been displayed for a predetermined required display time corresponding to at least one of: a time beginning at which the item of additional content can be skipped, a total playtime of the item of content, and a total playtime of the item of content.

10. The non-transitory computer-readable medium of claim 9, wherein the instructions, when executed by the one or more processors, further cause the one or more processors to perform operations comprising:
  associating with the context identifier, responsive to determining that the item of additional content has been displayed for the predetermined required display time, an indication that no additional content is to be displayed when additional content is triggered from the primary content;
  subsequently determining that display of additional content has been triggered from the primary content;
  identifying the indication that no additional content is to be displayed;
  subsequently unlocking content or providing access to the primary content; and
  deleting the indication that no additional content is to be displayed based on at least one of: determining that a predetermined amount of time has passed since generating the indication that no additional content is to be displayed, and determining that display of additional content has been triggered from the primary content a predetermined number of times.

11. A client device comprising:
  one or more processors coupled to memory, the one or more processors configured to:
  receive, from a content server, an item of additional content for display in an application
  in response to detecting a first event in the application while the application is presenting primary content, wherein the first event includes one or more of: (i) the application being open for a fixed amount of time, (ii) the primary content being presented by the application for a fixed amount of time, (iii) an attempt to unlock primary content in the application, or (iv) a game accomplishment in the application;
  provide, responsive to detecting the first event, the item of additional content for display;
  receive an instruction to navigate back to the same primary content via an interaction with a selectable object while the application is presenting the item of additional content;
  generate, in response to receipt of the interaction with the selectable object, a context token based on an impression index value, a context identifier while the application is presenting the primary content, and identifier of the first event, wherein the impression index value indicates a number of times that conditions defining context while the application is presenting primary content have been satisfied;
  in response to receipt of the interaction with the selectable object, locally store, the context token, the item of additional content and a first time corresponding to an amount of the item of additional content that was presented up to the interaction with the selectable object;
  detect, subsequent to the interaction with the selectable object that caused the application to navigate back to the same primary content, a second event while the application is presenting the same primary content, to cause the application to display the item of additional content, wherein the second event includes one or more of: (i) the application being open for a fixed amount of time, (ii) the primary content being presented by the application for a fixed amount of time, (iii) an attempt to unlock primary content in the application, or (iv) a game accomplishment in the application;
  determine whether to initiate display of the item of additional content from the first time, or whether to retrieve another item of additional content from the content server, based on whether the item of additional content is stored locally on the client device and the context token;
  initiate display of the item of additional content from the first time based on determining that the item of additional content is stored locally on the client device and based on the context token.

12. The client device of claim 11, wherein the one or more processors are further configured to:
  determine, at a time prior to determining that display of additional content has been triggered, that an initial display of content has been triggered from the primary content;
  identify the context identifier;
  determine that additional content associated with the context identifier is absent from the client device; and
  transmit, to the content server, a content request for additional content.

13. The client device of claim 11, wherein the one or more processors are further configured to:
  determine, prior to receiving the interaction to navigate back to the primary content, a predetermined required display time to be one of: a time beginning at which the item of additional content can be skipped, a total playtime of the item of additional content, and a total playtime of the item of additional content less a predetermined amount of time.

14. The client device of claim 11, wherein the one or more processors are further configured to:
  associate a context identifier with the impression index value that indicates a number of times that conditions defining the primary content have been satisfied;
  determine that one or more of the conditions which define the primary content are satisfied;
  increment the impression index value associated with the context identifier corresponding to the primary content;
  determine that display of additional content has been triggered from the primary content of the application;
  determine that additional content associated with the impression index value is absent from client device;
  transmit, to the content server, a second request for additional content;
  receive, from the content server, a second item of additional content for display; and
  initiate, responsive to receipt of the second item of additional content, display of the second item of additional content.

15. The client device of claim 14, wherein the one or more conditions are first conditions and wherein the one or more processors are further configured to reset or delete the impression index value responsive to determining that one or more second conditions which define a second primary content are satisfied.

16. The client device of claim 11, wherein the one or more processors are further configured to:
  receive, at an elapsed display time of first portion, the instruction to terminate display of the item of additional content, wherein second portion of the item of additional content begins from the elapsed display time of the first portion of the item of additional content; and
  store an association between the second portion, the context identifier, and the elapsed display time of the first portion of the item of additional content.

17. The client device of claim 11, wherein the one or more processors are further configured to:
- determine, subsequent to initiating display of the item of additional content for an elapsed display time, that a second display of the item of additional content has been triggered from the primary content of the application;
- identify the context identifier;
- determine that the item of additional content associated with the context identifier is stored in the client device;
- identify the elapsed display time associated with the item of additional content;
- initiate the second display of the item of additional content based on the stored elapsed display time;
- receive an instruction to terminate the second display of the item of additional content, store, the item of additional content and the context identifier; and
- update the elapsed display time for the item of additional content to be equal to a sum of (i) the stored elapsed display time and (ii) a time of display for the second display of the item of content.

\* \* \* \* \*